(12) United States Patent
Ikenoue

(10) Patent No.: US 10,216,987 B2
(45) Date of Patent: Feb. 26, 2019

(54) IMAGE PROCESSING DEVICE AND IMAGE PROCESSING METHOD

(71) Applicant: Sony Computer Entertainment Inc., Tokyo (JP)

(72) Inventor: Shoichi Ikenoue, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 286 days.

(21) Appl. No.: 15/048,063

(22) Filed: Feb. 19, 2016

(65) Prior Publication Data
US 2016/0171296 A1 Jun. 16, 2016

Related U.S. Application Data

(62) Division of application No. 13/132,365, filed as application No. PCT/JP2009/004442 on Sep. 8, 2009.

(30) Foreign Application Priority Data

Dec. 24, 2008 (JP) .................. 2008-328741
Dec. 24, 2008 (JP) .................. 2008-328742

(51) Int. Cl.
*G06T 7/20* (2017.01)
*G06K 9/00* (2006.01)
(Continued)

(52) U.S. Cl.
CPC ....... *G06K 9/00369* (2013.01); *G06K 9/4604* (2013.01); *G06K 9/6204* (2013.01);
(Continued)

(58) Field of Classification Search
None
See application file for complete search history.

(56) References Cited

U.S. PATENT DOCUMENTS 6,404,434 B1 6/2002 Shimada et al.
7,038,699 B2 5/2006 Sato et al.
(Continued)

FOREIGN PATENT DOCUMENTS

JP 8-315162 11/1996
JP 8-329254 12/1996
(Continued)

OTHER PUBLICATIONS

Ge, Shuzhi Sam, Y. Yang, and Tong Heng Lee. "Hand gesture recognition and tracking based on distributed locally linear embedding." Image and Vision Computing 26.12 (2008): 1607-1620.*
(Continued)

*Primary Examiner* — Jason Pringle-Parker
(74) *Attorney, Agent, or Firm* — Katten Muchin Rosenman LLP

(57) ABSTRACT

First, the data of a moving image that is captured is read for each frame, and whether to start tracking is determined based on the presence or absence of a target object (S20, S22). An edge image of the image frame is created after it is determined to start tracking (S24). Meanwhile, a particle is distributed in a space of a coefficient set for each control point sequence when the control point sequence of a B-spline curve representing the shape of the target object is represented in a linear combination of control point sequence of a B-spline curve representing a plurality of reference shapes that are made available in advance (S26). A particle is also distributed in the space of a shape-space vector (S28), the likelihood of each particle is observed, and the probability density distribution is acquired (S30). A curve obtained by weighting parameters by the probability density distribution and then averaging the weighted parameters is created as a tracking result (S32).

8 Claims, 7 Drawing Sheets

(51) Int. Cl.
G06K 9/62 (2006.01)
G06K 9/46 (2006.01)
G06T 7/277 (2017.01)
G06K 9/32 (2006.01)

(52) U.S. Cl.
CPC ...... *G06T 7/277* (2017.01); *G06K 2009/3291* (2013.01); *G06T 2207/20076* (2013.01); *G06T 2207/30196* (2013.01); *G06T 2207/30201* (2013.01)

(56) References Cited

U.S. PATENT DOCUMENTS

| | | | |
|---|---|---|---|
| 2004/0239670 A1* | 12/2004 | Marks | A63F 13/10 345/419 |
| 2005/0105770 A1* | 5/2005 | Sumitomo | G06K 9/00362 382/103 |
| 2006/0283521 A1* | 12/2006 | Bartholomew | A45D 29/00 141/104 |
| 2006/0291696 A1* | 12/2006 | Shao | G06K 9/3216 382/103 |
| 2007/0038944 A1* | 2/2007 | Carignano | G06T 15/20 715/757 |
| 2008/0063236 A1 | 3/2008 | Ikenoue et al. | |
| 2008/0273755 A1* | 11/2008 | Hildreth | G06F 1/1626 382/103 |
| 2010/0060632 A1* | 3/2010 | Lefevre | G06T 1/0007 345/419 |

FOREIGN PATENT DOCUMENTS

| | | |
|---|---|---|
| JP | 9-138471 | 5/1997 |
| JP | 9-147127 | 6/1997 |
| JP | 2000-149046 | 5/2000 |
| JP | 2000-306092 | 11/2000 |
| JP | 2000-322588 | 11/2000 |
| JP | 2002-271693 | 9/2002 |
| JP | 2002-366837 | 12/2002 |
| JP | 2003-55826 | 2/2003 |
| JP | 2005-4799 | 1/2005 |
| JP | 2005-242566 | 9/2005 |
| JP | 2006-217379 | 8/2006 |
| JP | 2007-27990 | 2/2007 |
| JP | 2007-34733 | 2/2007 |
| JP | 3930504 | 3/2007 |
| JP | 2007-328746 | 12/2007 |
| JP | 2007-328747 | 12/2007 |

OTHER PUBLICATIONS

Liu, Xiaoming, and Tsuhan Chen. "Geometry-assisted statistical modeling for face mosaicing." Image Processing, 2003. ICIP 2003. Proceedings. 2003 International Conference on. vol. 2. IEEE, 2003.*
Luan, Qing, et al. "Annotating gigapixel images." Proceedings of the 21st annual ACM symposium on User interface software and technology. ACM, 2008.*
Michael Isard et al. "Contour tracking by stochastic propagation of conditional density" In Proc. European Conf. Computer Vision, vol. 1, 1996, pp. 343-356.
Michael Isard et al. "Icondensation: Unifying low-level and high-level tracking in a stochastic framework" Proc 5th European Conf. Computer Vision, 1998.
Michael Isard et al. "Condensation—conditional density propagation for visual tracking" Int. J. Computer Vision, 29, 1, 1998, pp. 5-28.
Supplementary European Search Report dated May 27, 2013 from corresponding Application No. 09834250.4.
Notification of Reason(s) for Refusal dated May 28, 2013 from corresponding Japanese Application No. 2008-328741.
Notification of Reason(s) for Refusal dated May 28, 2013 from corresponding Japanese Application No. 2008-328742.
Notification of Reasons for Refusal dated Jan. 14, 2014 from corresponding Japanese Application No. 2008-328741.
U.S. Office Action dated Dec. 16, 2013 from corresponding U.S. Appl. No. 13/132,365.
U.S. Office Action dated May 9, 2014 from corresponding U.S. Appl. No. 13/132,365.
U.S. Office Action dated Jan. 12, 2015 from corresponding U.S. Appl. No. 13/132,365.
U.S. Office Action dated Mar. 27, 2015 from corresponding U.S. Appl. No. 13/132,365.
Examiner's Answer dated Jan. 4, 2016 from corresponding U.S. Appl. No. 13/132,365.
International Search Report dated Dec. 8, 2009, from corresponding International Application No. PCT/JP2009/004442.
International Preliminary Report on Patentability and Written Opinion of the International Searching Authority dated Aug. 9, 2011, from the corresponding International Application No. PCT/JP2009//004442.
Makoto Nishikawa, et al. "Extraction of Character String and Figure Region Pointed out by a Finger Tip Using Color Image Processing" Technical Report of IEICE, Jan. 22, 1999, vol. 98, No. 528, pp. 25-32.

* cited by examiner

IMAGE PROCESSING DEVICE AND IMAGE PROCESSING METHOD

TECHNICAL FIELD

The present invention relates to information processing technology and, more particularly, to an image processing device and an image processing method performed in the device, capable of analyzing the position and shape, and variation thereof, of an object in an input image.

BACKGROUND ART

Visual tracking is essential for many applications such as computer vision, human-machine interfacing, and human-human interfacing. Computer vision is especially focused in security technologies such as visual surveillance, and audio and visual technologies such as analysis, classification, and editing of recorded images. Human-human interfacing includes teleconferencing and videotelephony. Accordingly, there have been many studies undertaken on visual tracking, with a number of those specifically addressing tracking accuracy and processing efficiency. A major approach to visual tracking is now based on a particle filter. The particle filter attracts attention as a time series analysis tool for systems with non-Gaussian noise, which the well known Kalman filter cannot deal with. The CONDENSATION algorithm (Conditional Density Propagation) is well known as a technique based on a particle filter (see, for example, non-patent documents 1-3).

In the Condensation algorithm, a tracked object is defined by a contour line of an arbitrary shape comprising, for example, a B-spline curve. For example, the head of a person can be tracked by defining a Greek ohm-shaped curve using B-spline. This is because the shape of a head does not basically change in association with the person's action such as turning around or bending down so that the shape of a head can be represented only by translating, expanding, contracting, or rotating the Greek ohm-shaped curve (see, for example, patent document No. 1).

Meanwhile, remarkable progress in image processing technology has enabled processing captured images by adding virtual flair to the images, which are often seen in various scenes in our daily lives. For example, the contour of an object in an image carries weight in image processing such as replacement of the background in an image by another image or blending of images. Technologies for extracting a contour line include dynamical contour model (SNAKES) whereby a mode of a contour of an object is represented using a closed curve, and the contour of the object is estimated by deforming the closed curve so that a predefined energy function is minimized (patent document No. 2 or No. 3). Also proposed is a method of acquiring an object area by using a difference in background (patent document No. 4 or No. 5).

[Non-patent document No. 1] Contour tracking by stochastic propagation of conditional density, Michael Isard and Andrew Blake, Proc. European Conf. on Computer Vision, vol. 1, pp. 343-356, Cambridge UK (1996)

[Non-patent document No. 2] CONDENSATION-conditional density propagation for visual tracking, Michael Isard and Andrew Blake, Int. J. Computer Vision, 29, 1, 5-28 (1998)

[Non-patent document No. 3] ICondensation: Unifying low-level and high-level tracking in a stochastic framework, Michael Isard and Andrew Blake, Proc 5th European Conf. Computer Vision, 1998

[Patent document No. 1] JP 2007-328747
[Patent document No. 2] JP 9-138471
[Patent document No. 3] JP 8-329254
[Patent document No. 4] JP 3930504
[Patent document No. 5] JP 2007-34733

DISCLOSURE OF INVENTION

Problem to be Solved by the Invention

As described above, the Condensation algorithm is quite useful in respect of computational load, precision, etc. to track an object such as a person's head, ball, or automobile that does not substantially change its shape. Meanwhile, it is difficult for the algorithm to track an object with precision if the object shape changes so that the object cannot be represented merely by translating, expanding, contracting, or rotating a given shape. This has called for technology capable of recognizing change in the shape and position of an object while requiring small computational volume.

Image processing such as adding visual flair to an image has required extraction of contours of an object by manual steps, but a considerable operational cost should be incurred to isolate frames of moving images one by one. Meanwhile, the dynamical contour model has a disadvantage in that the model requires setting a contour model for each image initially and the ultimate result is affected by the initial setting. Moreover, the change in the shape of an object in moving images cannot be tracked properly when the dynamical contour model is utilized for the aforementioned visual tracking technology to identify contours of the object successively, since the model requires a large computational volume. The technique using difference in background requires restricted imaging environments by requiring, for example, a stationary background. As such, the range of applications of the technique is limited.

The present invention addresses the issue and a general purpose thereof is to provide image processing technology capable of recognizing change in the shape and position of an object without increasing computational load. Another purpose is to provide image processing technology capable of adding visual flair to an object without increasing the cost, even if the object moves in moving images.

Means for Solving the Problem

One embodiment of the present invention relates to an image processing device. The image processing device comprises: a reference-shape storage unit configured to store a plurality of parameters that define the contour line of a plurality of reference shapes; and an object-shape determination unit configured to represent and output, by defining a set of coefficients of each parameter in a linear combination of the plurality of parameters stored in the reference-shape storage unit, the shape of the contour line of an object in an image in the linear combination.

The image processing device may further comprise: an image acquisition unit configured to acquire a moving image stream including a first image frame and a second image frame in which the image of the object is captured, wherein the object-shape determination unit including: a shape prediction unit that creates and eliminates, in a space of a coefficient set defined by the set of the coefficients, a particle used for a particle filter based on an estimated existence probability distribution of the object in the first image frame so as to cause the particle to make a transition based on a predetermined transition model, an observation unit that observes the likelihood of each particle by computing a matching score between the contour line of the object in the second image frame and a candidate contour defined by the particle, and a contour-line acquisition unit that estimates the shape of the contour line of the object in the second image frame by computing the estimated existence probability distribution, in the space of the coefficient set, of the object in the second image frame based on the likelihood observed by the observation unit and then by weighting the set of the coefficients of each particle based on the estimated existence probability distribution.

Note that it makes no difference if the first image frame and second image frame are two contiguous or discontiguous image frames in an image stream. The first image frame is usually observed prior to the second image frame in general object tracking over time, but this order is not limited thereto in the present embodiment. The term "candidate contour" means the contour of a part or the whole of the object. The likelihood represents a measurement of how well a candidate contour defines the object. For example, if the target candidate is represented by a two-dimensional shape, the likelihood represents an overlap of the target candidate and the object, or a distance between the target candidate and the object.

A "particle" is introduced in a particle filter, which is one of the methods for estimating the current status based on past information and current information as observed. The sampling frequency of a parameter subject to observation is represented by the number of particles in a parameter space.

Another embodiment of the present invention relates to an image processing method. The image processing method comprises: reading, from a memory device, a plurality of parameters that define the contour line of a plurality of reference shapes and defining a set of the coefficients of each parameter in a linear combination of the parameters; and representing and outputting the contour line of an object in an image in the linear combination by using the defined set of the coefficients.

Another embodiment of the present invention relates to an image processing device. The image processing device comprises: a contour-line acquisition unit configured to acquire the contour line of an object from an image frame that constitutes a moving image; a target-part identification unit configured to identify the position of a predetermined part of the object based on the contour line of the object acquired by the contour-line acquisition unit; a processing unit configured to create a processed image in which predetermined processing is performed on an area, which is determined based on the position of the predetermined part identified by the target-part identification unit, in the image frame; and an output unit configured to output data of the moving image having, as the image frame, the processes image generated by the processing unit.

Another embodiment of the present invention relates to an image processing method. The image processing method comprises: reading an image frame constituting a moving image stored in memory and acquiring the contour line of an object; identifying an area of the object or of a predetermined part of the object based on the contour line; and creating a processed image in which predetermined processing is performed on an area determined by the identified area in the image frame.

Optional combinations of the aforementioned constituting elements, and implementations of the invention in the form of methods, apparatuses, systems, computer programs, and recording media recording computer programs may also be practiced as additional modes of the present invention.

Advantageous Effects

According to the present invention, information regarding change in the position or shape of an object can be acquired while requiring small computational load. Also, various visual flair can be easily added to an object that moves in an image.

BEST MODE FOR CARRYING OUT THE INVENTION

Figure 1:
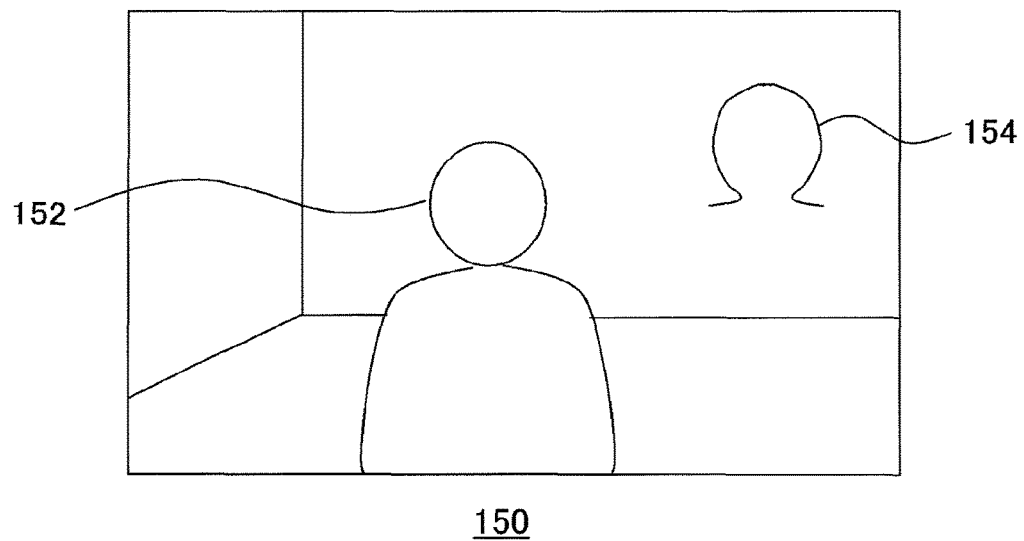
FIG. 1 illustrates a visual tracking method where a person is the target object.

Visual tracking using a particle filter will now be described to clarify the features and advantages of the embodiments of the present invention. FIG. 1 illustrates a visual tracking method where a person is the target object. The video stream to be processed, such as a live-action video picture, or computer-generated animation, consists of image frames. An image 150 of a person is one of the image frames and shows a person 152 being the target object.

In order to track the motion of the person 152, the head and shoulder contours of the person 152 (hereinafter, simply referred to as the head contour) is approximated by a Greek ohm-shaped curve 154 where the Greek ohm-shaped curve 154 is described by a known representation. The image 150 of the person, which shows the person 152, is subjected to an edge extracting process, and an edge image is thereby obtained. The curve 154 is then translated, expanded, contracted, or rotated by changing the parameters defining the curve 154, and edge near the curve 154 is detected so as to obtain the parameters that best match the head contour of the person 152. The above process is repeated for each frame, so that tracking of the person 152 proceeds. In this instance, the edge usually refers to a position at which density or color changes drastically in an image.

The matching score computation of the curve 154 defined by various parameter values and the head contour of the person 152 is implemented by a probability distribution prediction technique using a particle filter. Specifically, the number of the target candidates is reduced by increasing or decreasing the sampling number of the curve 154 according to a probability distribution of the object in the parameter space of the previous image frame. As a result, it becomes possible to focus the search on areas where the existence probability is high, allowing for accurate, efficient matching score computation.

Applications of the particle filter to tracking that focuses on object contours are described in detail in, for example, the non-patent document 3: Michael Isard and Andrew Blake, ICONDENSATION: Unifying low-level and high-level tracking in a stochastic framework, Proc. 5th European Conf. Computer Vision, 1998. The process required to apply such a tracking technique to the present invention is described below.

The Greek ohm-shaped curve 154 is first described by a B-spline curve. The B-spline curve is represented by n control points (Q0, ... Qn) and n knots (s0, ... sn). These parameters are preset to describe a fundamental curve shape, in this instance being a Greek ohm shape. The fundamental curve described by the preset parameters is hereinafter referred to as the template Qt. Note that the shape described by the template Qt depends on a target object and in the present instance is a Greek ohm shape when the person 152 in the person image 150 shown in FIG. 1 is the target object. For example, when the target object is a ball, the curve to be described has a circular shape; when the target object is a palm, the curve has a palm shape.

Next, a shape-space vector x is given as the transformation parameters for changing the state of the template. The shape-space vector x is represented by six parameters as follows:

$$x = (shift_x, shift_y, extend_x \cos \theta - 1, extend_y \cos \theta - 1, -extend_x \sin \theta, extend_y \sin \theta)^T \quad (1)$$

where (shiftx, shifty) is a translation amount in (x, y) direction, (extendx, extendy) is a magnification, and θ is a rotation angle. Using the operational matrix W for operating the shape-space vector x on the template Qt, the curve after transformation, i.e., the candidate curve Q, is represented as follows:

$$Q = Wx + Q_t, \quad (2)$$
$$W = \begin{pmatrix} 1 & 0 & Q_t^x & 0 & 0 & Q_t^y \\ 0 & 1 & 0 & Q_t^y & Q_t^x & 0 \end{pmatrix}$$

Expression 2 with the six parameters of the shape-space vector x changed accordingly makes it possible to translate, rotate, expand, and contract the template and combinations of these operations allow the candidate curve Q to change accordingly.

Next, the edges of the person 152 close to the respective knots of multiple candidate curves are detected. The multiple candidate curves are described by the various parameters of the template Qt, such as intervals of the control points and knots, and various sets of the six parameters of the shape-space vector x. Likelihoods of the candidate curves are then calculated from, for example, the distances between the edges and the knots. The probability density distribution in the six-dimensional space defined by the six parameters of the shape-space vector x is estimated based on these likelihoods.

Figure 2:
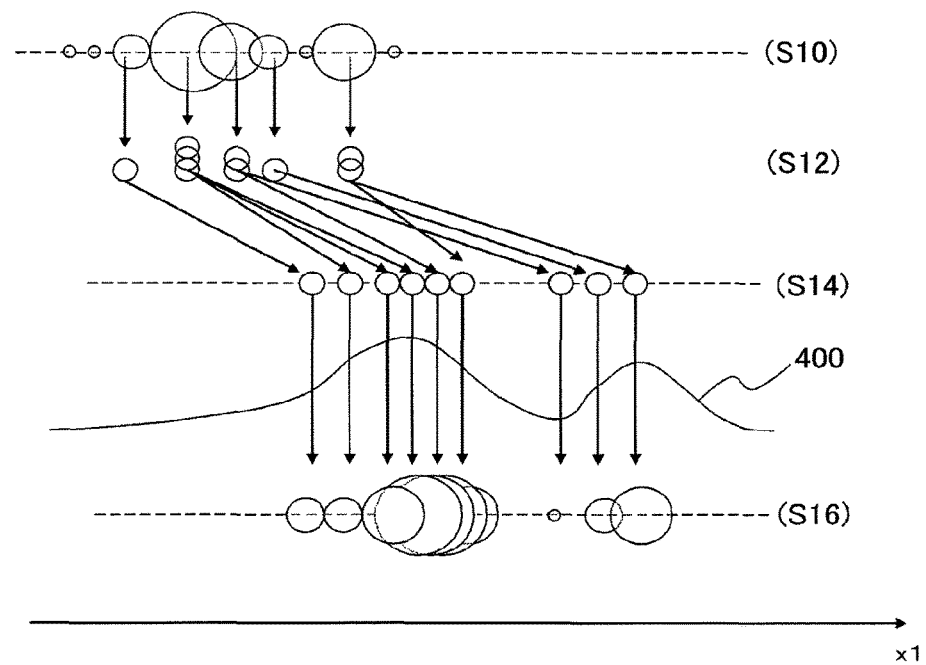
FIG. 2 illustrates a probability density estimation using a particle filter.

FIG. 2 illustrates a probability density distribution estimation using a particle filter. In FIG. 2, the horizontal axis shows parameter x1, which is one of the six parameters of the shape-space vector x, to aid understanding of the present invention. However, it should be appreciated that the other parameters are actually processed in the same manner as the parameter x1 in the six-dimensional space. In this instance, consider the example where the image frame whose probability density distribution is to be estimated is at time t.

A probability density distribution in the axis for the parameter x1 is given (S10). This probability density distribution is estimated in the image frame at time t−1, which is one frame previous to the image frame at time t. Particles at time t are then created using the estimated probability density distribution (S12). If there are already particles obtained by filtering, it is determined at this point whether the particles are divided or eliminated. The probability density distribution shown at step S10 is discretely calculated in accordance with the coordinates in the parameter space, and it shows that the larger the circle, the higher the probability density.

The particles are a representation of the sample values of the parameter x1 and the sampling densities. For example, a high probability density region of parameter x1 at time t−1 is described by particles with a high density, so that sampling is focused thereon; a low probability density region is described by particles with a low density, so that the sampling number is small. This allows for efficient matching score computation by creating a large number of the candidate curves near the edge of the person 152, for example.

The particles are then caused to make a transition in the parameter space using a given motion model (S14). The motion model is, for example, a Gaussian motion model, or an autoregression motion model. The Gaussian motion model defines that a probability density at time t around each probability density at time t−1 shows a Gaussian distribution. The autoregression motion model is a technique that assumes an autoregression prediction model for sample data in more than two dimensions; for example, it assumes from changes in the previous parameters that the person 152 moves at a constant speed. With reference to FIG. 2, it is assumed by the autoregression motion model that the parameter x1 moves in the positive direction and the particles are transited accordingly.

The edges of the person 152 close to the candidate curve specified by each particle is searched for using the edge image obtained at time t, the likelihoods of the candidate curves are calculated using the search result, and the probability density distribution at time t is estimated based on these likelihoods (S16). As described above, the estimated probability density distribution discretely shows a true probability density distribution 400, as shown in S16. The probability density distribution at each time is described in the parameter space by repeating the above detailed process. For example, when a probability density distribution is unimodal, in other words, if there is only one target object, a curve estimated to be the contour of the target object is obtained by finally setting, as each parameter, a sum of the parameter values which are weighted with the probability densities.

The probability density distribution $p(x_t^i)$ at time t estimated in S16 is calculated as follows:

$$p(\hat{x}_t^i) = \eta p(y_t | \hat{x}_t^i) \int p(\hat{x}_t^i | \hat{x}_t^i, u_{t-1}) p(\hat{x}_{t-1}^i) d\hat{x}_{t-1}^i \quad (3)$$

where i is a unique particle number, $p(x_t^i|x_{t-1}^i, u_{t-1})$ is a given motion model, and $p(y_t|x_t^i)$ is a likelihood.

The method discussed above tracks an object on the assumption that the shape of the template initially set is maintained to a certain extent and so is quite useful in that the method is capable of tracking the object with high precision while requiring small computational volume, given that the shape of the object changes little as in the case of the head of a person. Meanwhile, the method is disadvantageous in that it cannot address change in the shape of the object that cannot be represented merely by translation, expansion, contraction, or rotation. The embodiment addresses the disadvantage by representing a parameter set defining the shape of a tracked object in a linear combination of a plurality of parameter sets prepared in advance and by adjusting coefficients. This enables tracking capable of addressing change in the shape of the object.

The following description concerns a case where a control point sequence defining a B-spline curve is employed as a parameter set represented in a linear combination. N control point sequence Q0, Q1, . . . , QN are made available. As described above, each control point sequence comprises n control points, the sequence defining different B-spline curves. The control point sequence Qsum defining a B-spline curve representing an estimated shape of the object is represented in a linear combination of the N control point sequence as below.

$$Q_{sum} = \alpha_0 \times Q_0 + \alpha_1 \times Q_1 + \ldots + \alpha_N \times Q_N \quad (4)$$

where coefficients $\alpha 0, \alpha 1, \ldots, \alpha N$ indicate weights of the control point sequence made available. The shape of the object is represented by varying a set of coefficients $\alpha 0, \alpha 1, \ldots, \alpha N$ (hereinafter, referred to as coefficient set $\alpha$). A particle is defined by a coefficient set $\alpha$ in addition to a shape-space vector x. The likelihood of each particle is observed so that the probability density distribution of the coefficient set $\alpha$ in the space is computed as in expression 3.

By representing the shape of an object in a linear combination of parameters defining a plurality of preset shapes, intermediate shapes occurring in between the preset shapes (hereinafter, referred to as reference shapes) can be represented. Therefore, the computation volume is less than the method where image data for all shapes of an object are made exhaustively available for matching score computation. In further accordance with the embodiment, the inventive simple method of representation is utilized to search efficiently and improve precision while requiring small computational load. This is achieved by defining the probability of transition of a coefficient set $\alpha$. Basically, as in the case of a shape-space vector x, sampling is performed by causing each particle to make a transition in the space of the coefficient set $\alpha$ according to a preset model, by creating or eliminating the particle based on the probability density distribution in the space. Candidate contour lines are identified by further creating and eliminating the particle so as to cause the particle to make a transition based on the probability density distribution in the space of shape-space vectors x, and the likelihood of the candidates is observed.

Figure 3:
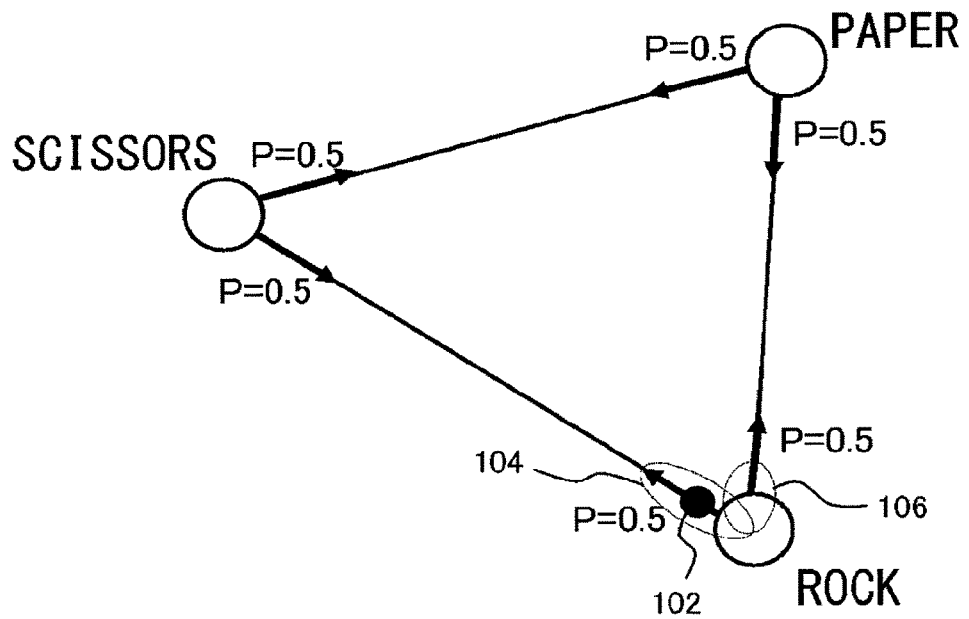
FIG. 3 illustrates values of a coefficient set and a transition model in the embodiment.
Figure 4:
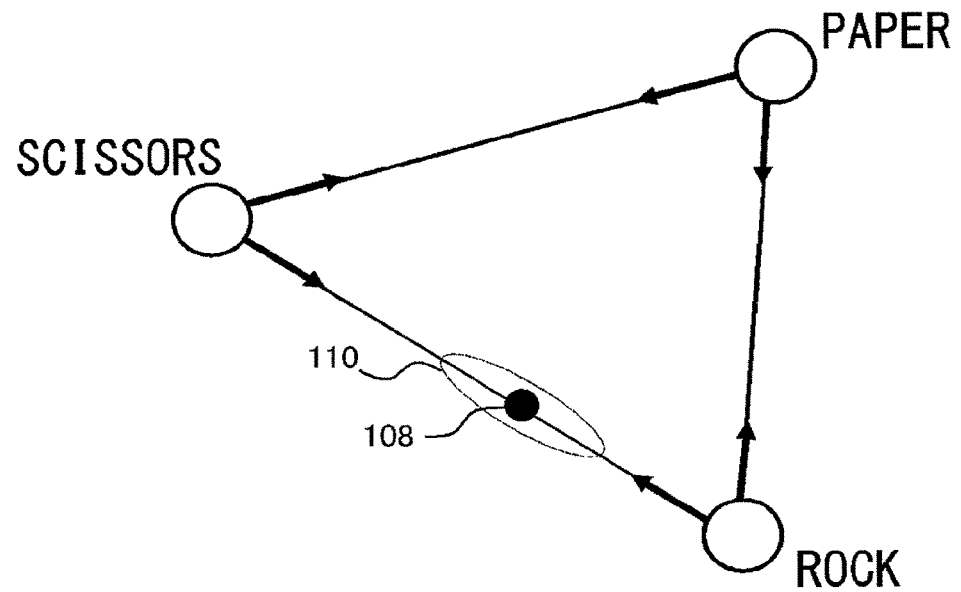
FIG. 4 illustrates values of a coefficient set and a transition model in the embodiment.

FIGS. 3 and 4 illustrate values of coefficient set $\alpha$ and a transition model. The figures show an example where the human hand playing rock, paper, and scissors is tracked. B-spline curves of three reference shapes, including "rock," "paper," and "scissors," are made available. Given that the control point sequence defining these reference shapes are Q0, Q1, and Q2 of expression 4, the coefficient set $\alpha$ will be $\alpha$ ($\alpha 0, \alpha 1, \alpha 2$)=(1.0, 0.0, 0.0) if the shape tracked is "rock." Similarly, if "scissors" is tracked, $\alpha$=(0.0, 1.0, 0.0), and if "paper" is tracked, $\alpha$=(0.0, 0.0, 1.0). Thus, if the object is in one of the reference shapes "rock," "paper," and "scissors" currently, the probability of making a transition to each of the other two reference shapes, i.e., the probability of making a transition to "scissors" or "paper" from "rock," at a next point of time will be defined as P=0.5.

Even if the coefficient set $\alpha$ is slightly displaced from the sequence representing the reference shape, the set may reasonably be considered as representing a reference shape. In this respect, a range of coefficient set $\alpha$ that can be considered as representing a reference shape is preset. For example, it is ensured that shapes defined by a located within a certain Euclid distance from (1.0, 0.0, 0.0) in the space defined by coefficient sets $\alpha$ are considered as "rock." It will be assumed that the current shape is represented by a solid circle 102 and the coefficient set $\alpha$ is (0.9, 0.1, 0.0). If it is established that the state is considered as "rock," the probability P of making a transition to "scissors" or "paper" is defined to be 0.5.

Alternatively, transition to "scissors" may be considered as being slightly more likely so that the probability is weighted such that the probability of transition to "scissors" is higher than the probability of transition to "paper" in accordance with the Euclid distance between (1.0, 0.0, 0.0) and (0.9, 0.1, 0.0). Particles are located according to the probability of transition, and the particles are distributed in a Gaussian distribution 104 around a coefficient set $\alpha$ indicated by a solid circle 102, which indicates the current state, and in a Gaussian distribution 106 around a predetermined coefficient set $\alpha$ within the range of "rock" and oriented toward "paper."

Referring to FIG. 4, it is assumed that the current state is indicated by the solid circle 108 and the coefficient set $\alpha$ is (0.4, 0.6, 0.0), which is outside the range in which the shape is considered as "rock" and the range in which the shape is considered as "scissors." In this case, it is determined that the shape is in the middle of transition to "rock" or "scissors" so that particles are distributed in a Gaussian distribution 110 around the coefficient set $\alpha$ indicated by the solid circle 108, which indicates the current state. Gaussian distributions 104, 106, 110 of FIGS. 3 and 4 are actually distributions in a three-dimensional space defined by a coefficient set ($\alpha 0, \alpha 1, \alpha 2$). In this case, the standard deviation of distribution in the direction of line connecting the coefficient sets $\alpha$ representing the reference shapes to be reached (in the example of FIG. 4, "rock" and "scissors") may be larger than those in the other directions. In this way, a larger number of particles can be located in shapes with higher probability of transition so that sampling efficiency and tracking precision are improved.

Particle distribution is not limited to the one described above. Gaussian distribution with equal standard deviations in all directions may be employed. Alternatively, models other than Gaussian distribution may be introduced. For example, the motion of coefficient sets $\alpha$ in a plurality of frames up to the current time may be acquired and the regression prediction model may be introduced. For example, if it can be determined that transition from "rock" to "scissors" proceeds at a constant speed by referring to the past frames, a larger number of particles are located in the direction of "scissors."

The probability P of transition from a given reference shape to another reference shape is such that P=0.5 given the three reference shapes "rock," "scissors," and "paper." The value of P varies depending on the number of reference shapes. Provided that the number of reference shapes as possible destination of transition from a given reference shape is denoted by N, the probability of transition to each destination reference shape will be denoted by 1/N. The probability of transition may not equal in different paths of transition and may be ununiform. Alternatively, the probability may be determined dynamically based on the history of events.

In expression 4, a linear combination of control point sequence is used as a parameter defining a B-spline curve representing the shape of a tracked object. A linear combination of knots, which are also parameters defining a B-spline curve, may be used. Expansion from control points to knots requires only a single step so that the use of control points will be more efficient.

Figure 5:
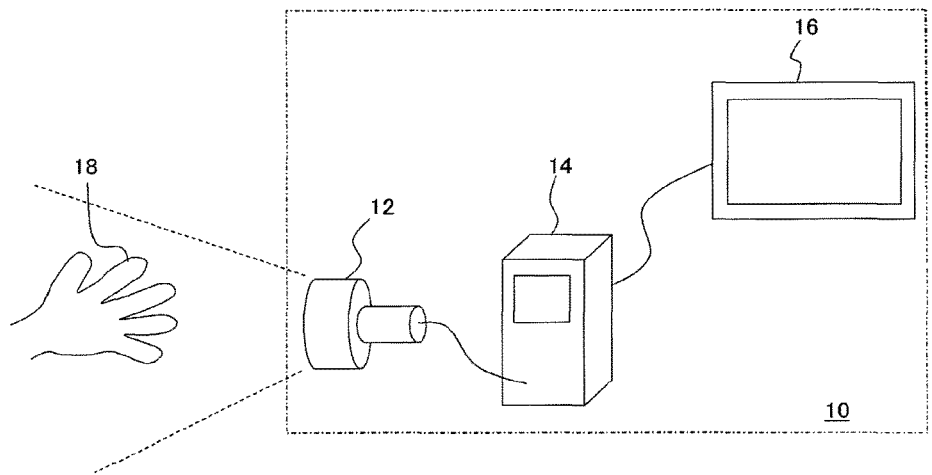
FIG. 5 illustrates an exemplary configuration of a visual tracking system according to the embodiment.

FIG. 5 illustrates an exemplary configuration of a visual tracking system according to the embodiment. The visual tracking system 10 comprises an image capturing device 12 that captures a target object 18, a tracker 14 that performs a tracking process, and a display 16 that shows image data obtained by the image capturing device 12 or the tracking result data. The target object 18 depends on the intended use of the visual tracking system 10, and it is, for example, a person(s), an article(s), or their parts.

The tracker 14 and the image capturing device 12 or the display 16 are connected to each other regardless of whether the connection is wired or wireless or they may be connected through specific networks. Alternatively, any two of or all of the image capturing device 12, tracker 14, and display 16 may be integrally provided. In a certain use environment, the image capturing device 12 and display 16 may not always be connected to the tracker 14.

The image capturing device 12 acquires image data at a predetermined frame rate. The image data includes images of the target object 18 or images of a specific place with or without the target object 18 included. The image data acquired is input into the tracker 14 and a tracking process of the target object 18 is performed. The process result is then output to the display 16 as output data controlled by the tracker 14. The tracker 14 may be a computer that performs other functions with use of, for example, the tracking result data, i.e., the position and shape information of the target object 18.

Figure 6:
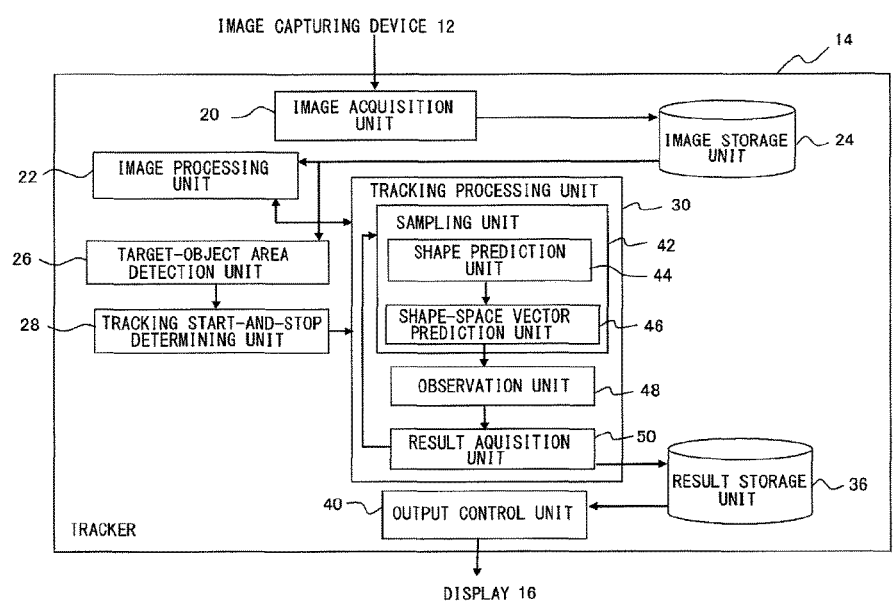
FIG. 6 illustrates a detailed configuration of the tracker.

FIG. 6 illustrates a detailed configuration of the tracker 14 according to the embodiment. The tracker 14 comprises: an image acquisition unit 20 that acquires the image data input by the image capturing device 12; an image storage unit 24 that stores data such as the input image data that is necessary for the tracking process; an image processing unit 22 that generates an edge image and the like from the input image data; a target-object area detection unit 26 that detects an area of a target object; a tracking start-and-stop determining unit 28 that determines the starting and stopping of tracking; a tracking processing unit 30 that performs the tracking process using a particle filter; a result storage unit 36 that stores the final tracking result data; and an output control unit 40 that controls the output of the tracking result data to the display 16.

In FIG. 6, the components described as functional blocks which perform various processes are provided by hardware such as CPU, memory, and other LSI, or by software such as image processing programs and the like. Therefore, it will be obvious to those skilled in the art that the functional blocks may be implemented in a variety of manners by a combination of hardware and software.

The image processing unit 22 extracts the contour of the target object. Specifically, the image processing unit 22 performs an edge extracting process on each image frame of the input image data stored in the image storage unit 24 to generate edge images. A typical edge extracting algorithm, such as the Canny edge filter or the Sobel filter, may be used in the edge extracting process. The image processing unit 22 may perform preprocess prior to the edge extracting process, in order to efficiently extract the edges of the target object. For example, the image processing unit 22 includes a foreground extractor (not shown) that uses background subtraction, thereby extracting foreground objects including the target object from the input image.

The target-object area detection unit 26 detects the area for a target object by performing image analysis for every image frame of input image data stored in the image storage unit 24. For example, the target-object area detection unit 26 includes a foreground extractor (not shown) in which a background difference is used, determines the presence of a target object from the shape of foreground extracted from the image frame, and detects the area. If a target object is the head of a person, a face detection technique may be further applied. Alternatively, an area having a color different from the background or having a specific color may be detected as a target object by a color detector. The area of a target object may be detected by pattern matching against the shape of a target object set in advance.

Furthermore, in addition to the image capturing device 12, the visual tracking system 10 may be provided with a temperature sensor that measures the heat distribution of the space of an object whose image is to be captured or with a piezoelectric sensor that acquires the contact domain of a target object in a two dimensional manner so as to detect the area of the target object by the heat distribution or the pressure distribution. Existing techniques can be applied for the detection of a target object by a temperature sensor or a piezoelectric sensor.

The tracking start-and-stop determining unit 28, based on the detection result of the target-object area by the target-object area detection unit 26, determines the starting and stopping of tracking. The stopping includes suspension of tracking due to occlusion or the like. The tracking is started, for example, when the target object appears in the viewing angle of the image capturing device or appears from behind something. The tracking is stopped, for example, when the target object passes out of the viewing angle of the image capturing device or hides behind something. Notifying the tracking processing unit 30 of the determination result allows the tracking process of the tracking processing unit 30 to be started or stopped.

The tracking processing unit 30 includes a sampling unit 42, an observation unit 48, and a result acquisition unit 50. The sampling unit 42 includes a shape prediction unit 44 that performs sampling in the space of a coefficient set $\alpha$ and a shape-space vector prediction unit 46 that performs sampling in the space of a shape-space vector x. The shape prediction unit 44 creates and eliminates particles based on the probability density distribution in the space defined by coefficient sets $\alpha$, which is estimated for the image frame at the previous time t−1. As in the above-described example where the human hand playing rock, paper, and scissors, particles are distributed under a predetermined rule according to the shape represented by the particles.

The shape-space vector prediction unit 46 creates and eliminates particles based on the probability density distribution in the space defined by shape-space vectors x, which is estimated for the image frame at the previous time t−1. The particles are then made to undergo a transition in the space by applying a given motion model to all the particles. The processes of the shape prediction unit 44 and the shape-space vector prediction unit 46 allow for the determination of multiple candidate curves in the image frame obtained at time t in the light of any change in the shape and of translation, expansion, contraction, or rotation. The sampling unit 42 starts the process when receiving a tracking start signal from the tracking start-and-stop determining unit 28, and stops the process when receiving a tracking stop signal.

The observation unit 48 observes the likelihood of the candidate curve defined by each particle that is generated, eliminated, and transited by the sampling unit. As described above, the likelihood is determined by searching for edges in the neighborhood of the candidate curves in the edge image generated by the image processing unit 22 and estimating distances to the edges for the respective candidate curves. The result acquisition unit 50 computes, for each space defined by coefficient sets α and space of shape-space vectors x, the probability density distribution given by expression 3 based on the observed likelihood from the observation unit 48, derives a tracking result, and stores the result in the result storage unit 36. The tracking result may be data of the curve defined by parameters weighted by the corrected likelihood and averaged. The data is returned to the sampling unit 42 in order to use it in a tracking process at time t+1. The data stored in the result storage unit 36 may be the values of parameters weighted and averaged, the image formed only by the curve defined by the parameters, or the data for the composite image composed of the curve and the input image.

If there is a plurality of target objects, the result acquisition unit 50 may perform tracking using templates specific to respective target objects for each target object and combine the tracking results to obtain one tracking result. The result acquisition unit 50 also detects an overlap of the target objects and eliminates one from behind another at a certain time in terms of the tracking process. Accordingly, even when a current target object hides behind another target object, and thus its observation likelihood temporarily goes down, it is possible to prevent the output of an incorrect tracking result.

By performing the aforementioned processes by the image processing unit 22 and the tracking processing unit 30 for each frame, the result storage unit 36 is capable of storing, for example, the data for moving image that includes the tracking result. In this case, the contour line may be shown moving in association with the motion of the target object by outputting the data for moving image to the display 16 under the control of the output control unit 40. As described above, in addition to being displayed in the form of a moving image, the tracking result may be, for example, output to another operation module depending on the purpose of tracking.

A detailed description will now be made of the operation of the tracker 14 by the configurations described thus far. The image capturing device 12 captures an image of the target object at a predetermined frame rate according to, for example, an instruction input from a user. The captured image is input into the image acquisition unit 20 of the tracker 14 as input image data and is then stored in the image storage unit 24. Parameters representing multiple reference shapes, in the above example, the three types of control point sequence that define "rock," "paper," and "scissors" are stored in the image storage unit 24. The tracking process as described below will then be performed.

Figure 7:
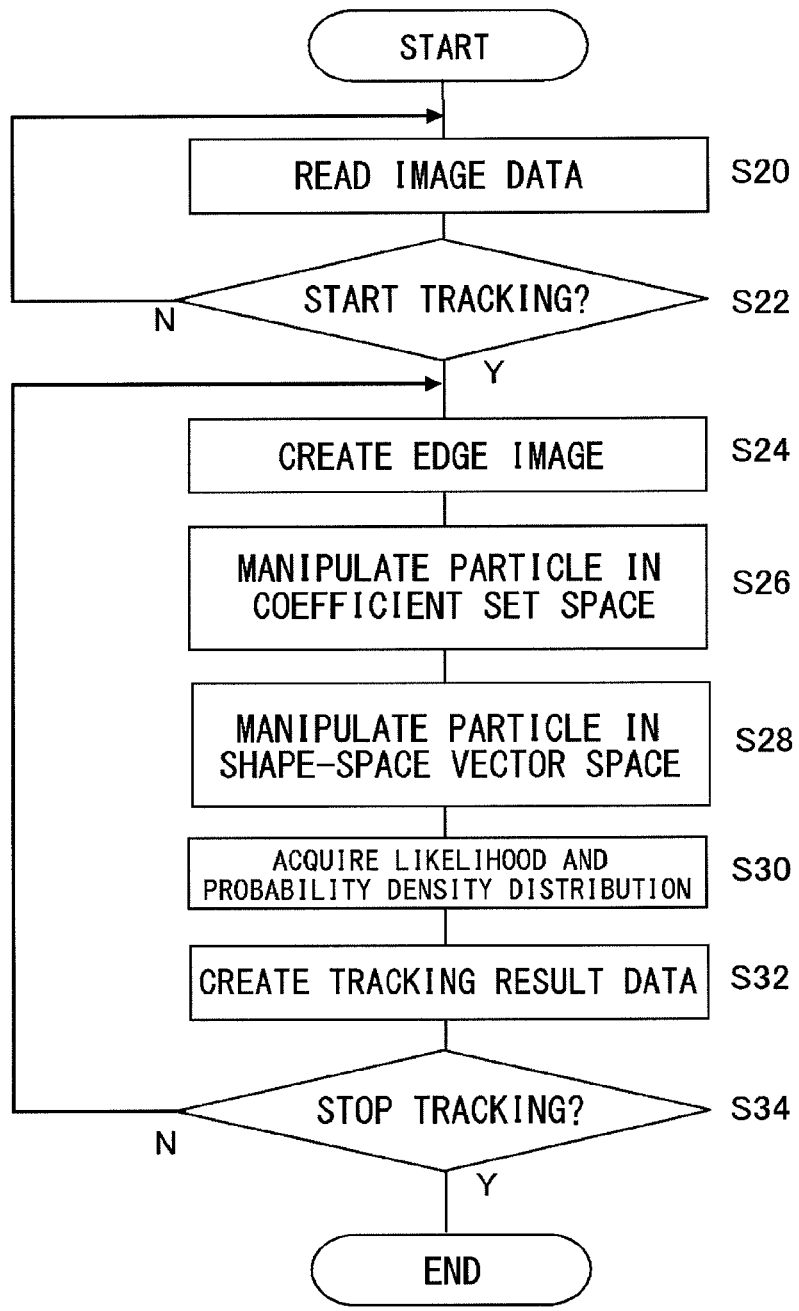
FIG. 7 is a flow chart showing the tracking process according to the embodiment.

FIG. 7 is a flow chart showing the tracking process according to one embodiment of the present invention. First, the target-object area detection unit 26 reads the input image data stored in the image storage unit 24 for each image frame so as to detect the area where an object that can be a target object exists. The tracking start-and-stop determining unit 28 determines whether to start tracking based on the result (S20, S22). For example, when a foreground object extracted from an image frame matches an object having a predetermined size and shape by which a palm is identified, the tracking start-and-stop determining unit 28 starts tracking. The foreground size and shape being the criteria for determining a match may be determined in either a logical or experiential way.

In the steps S20 and S22, N is repeated until the tracking start-and-stop determining unit 28 determines to start tracking. If the tracking start-and-stop determining unit 28 determines to start tracking (S22: Y), the tracking processing unit 30 starts a tracking process. In this instance, the image frame for which tracking is determined to start is assumed to occur at time t=0. Subsequent image frames are assumed to occur at time t=1, 2, 3, . . . , respectively. The sampling unit 42 first requests the image processing unit 22 to perform the edge image generation process. In response to that, the image processing unit 22 generates the edge image of the image frame at t=0 (S24). The sampling unit 42 may request the edge image generation process of a subsequent frame, and the image processing unit 22 may sequentially perform a process.

The shape prediction unit 44 of the sampling unit 42 then performs sampling by arranging particles uniformly in a predetermined area in the space defined by the coefficient sets α (S26). When the target-object area detection unit 26 detects by template matching or the like that the target object is in any one of the reference shapes, the particles may be locally distributed in the predetermined range of the coefficient set that defines the reference shape. The shape-space vector prediction unit 46 then performs sampling by arranging the particles uniformly in a predetermined area in the parameter space (S28). The observation unit 48 observes the likelihood of the candidate curve and edge image defined by each particle by matching score computation and the result acquisition unit 50 calculates the initial value p(t=0) of the probability density distribution by applying expression 3 in both the spaces defined by coefficient sets α and by shape-space vectors x (S30).

The result acquisition unit 34 then determines the shape and position of the target object at time t=0 by ultimately identifying the curve obtained by weighting the parameters by the probability density distribution p(t=0) and then averaging the weighted parameters. The result acquisition unit 34 also generates desired tracking result data by, for example, combining with the original input image frame and stores the resultant data in the result storage unit (S32).

On the other hand, the image processing unit 22 reads the image frame at t=1 from the image storage unit 24 and generates an edge image (S34:N, and S24). The sampling unit 42 generates particles, the number of which corresponds to the initial value p(t=0) of the generated probability density distribution, over the space defined by coefficient sets α so that the particles are distributed according to the values of the coefficient sets α (S26). The sampling unit 29 further generates particles over the space defined by shape-space vectors x and causes the particles to make a transition based on a predetermined motion model (S28). The number of particles generated is adjusted in consideration of the processing load based on the amount of calculation resources available in the tracker 14, the required rate of output result, and the like. A distribution rule and a motion model offering accurate tracking such as a Gaussian motion model, an autoregression motion model, or the like are selected depending on the type of target object.

The observation unit 30 observes the likelihood of each of the candidate curves defined by the particles after the transition and then obtains the probability density distribution p(t=1) at time t=1 based on the result (S30). Observation of the likelihood is performed by searching for contour lines in the neighborhood of the candidate curves, using the edge image at time t=1 generated by the image processing unit 22 in S24. If there are a plurality of target objects, the above-described process is performed for all the target objects. The result acquisition unit 34 then determines the shape and position of the target object at time t=1 by ultimately identifying the curve obtained by weighting the parameters by the probability density distribution p(t=1) and then averaging the weighted parameters. The result acquisition unit 34 also generates desired tracking result data by, for example, combining with the original input image frame and stores the resultant data in the result storage unit (S32).

The tracking start-and-stop determining unit 28 determines whether to continue or stop the tracking process (S34). For example, when a predetermined time has elapsed in the state where there is no foreground object having a predetermined size and shape by which a palm is identified, the tracking start-and-stop determining unit 28 determines that the tracking process should stop. Alternatively, the tracking start-and-stop determining unit 28 determines to stop the tracking after a predetermined time has elapsed in the occlusion state, for example, when the current target object hides behind another target object in real space. Furthermore, the tracking start-and-stop determining unit 28 detects, by a similar method for the occlusion, the state where a predetermined time has elapsed after the target object becomes out of the viewing angle of the image capturing device 12 and determines to stop the tracking.

When the continuation of the tracking process is determined in S34 (S34:N), while an edge image is created from the image frame at time t=2, particles are operated by using the probability density distribution p(t=1) obtained in S32 at time t=1, and, for the frame at time t=2, the likelihood is observed, the probability density distribution is computed, and the tracking result is generated (S24-S32). The processes of S24 to S32 are repeated for each image frame until the tracking start-and-stop determining unit 28 determines to stop tracking in S34 (S34:Y). Accordingly, video data in which a contour line, which is the tracking result, changes its shape and motion over time while following those of the palm playing rock, paper, and scissors is stored in the result storage unit 36. The output control unit 40 outputs the video data to the display 16, or to a module providing other functions and the like, thereby enabling the user to use the tracking result as desired.

In the above explanation, a method of representing the reference shape of a palm with use of a B-spline curve is mainly described. The target object is not limited to a palm, and the same applies to an object that changes its shape such as an entire human body, an animal, or a matter. A method of representation of a curve or a straight line that represents the shape of a target object and a parameter that defines the shape are not limited to a B-spline curve, a control point, or the like.

As described above, the present embodiment enables visual tracking capable of addressing change in the shape of a target object. Being capable of addressing change in the shape means, in other words, being capable of identifying the shape of an object. In the process of the calculation, the distribution of a coefficient set α that defines the shape of a subsequent image frame is predicted with use of a transition model based on a coefficient set α that defines the shape of the previous image frame. In other words, not only that the shape of the target object in the current image frame is identified, but also the shape of the target object in the subsequent frame is predicted.

Using this feature allows for the detection of the motion of the user in front of a camera in real time with a minimum delay time due to various processes, and a highly responsive user interface can thus be provided. For example, when moving a virtual person drawn on the screen in accordance with the motion of one's body or when operating a remote-controlled robot hand, the time required from inputting information and to outputting a result can be reduced.

In the above-described explanation, the example is given where the output control unit 40 generates a moving image in which the contour line moves in association with the motion of the target object by combining, with the input image, the contour line of the target object obtained as a result of the tracking process. In the present embodiment, the contour line of a target object can be traced with high accuracy regardless of the presence or absence of change in the shape, as described above. Using this feature allows not only a contour line to be displayed but also various visual effects to be provided to the area of a target object or the other area in an image. An example thereof is described in the following.

For example, when the contour line of a hand is obtained by a tracking process, the approximate positions of all five fingers and of the nails of respective fingers can be identified. The "position" may be the position of a point such as a characteristic point or may be the position of a plane having a finite area. In a configuration where the image of a user's hand is captured and displayed on a display, nail art or a ring can be virtually tried on by combining an image of fingernails wearing the nail art at the position of the fingernails or combining an image of the ring at the base of a desired finger.

The tracker 14 can derive the contour line in association with change in the motion or shape of a hand. Thus, the hand does not need to be at a predetermined position or in a predetermined state. Even when the orientation or size of the nails, etc. change in accordance with, for example, the orientation, size, position in the depth direction of the hand, changing the shape of a prepared image in accordance with the change allows the image of nail art or a ring that fits the actual hand to be combined, increasing the reality. Further, since the inclination of the hand can be estimated by the motion of the contour line, changing an image to be combined according to the inclination (front side, lateral side, etc.) with respect to a camera allows the shade, the reflecting condition of a light, or the like to be checked.

Figure 8:
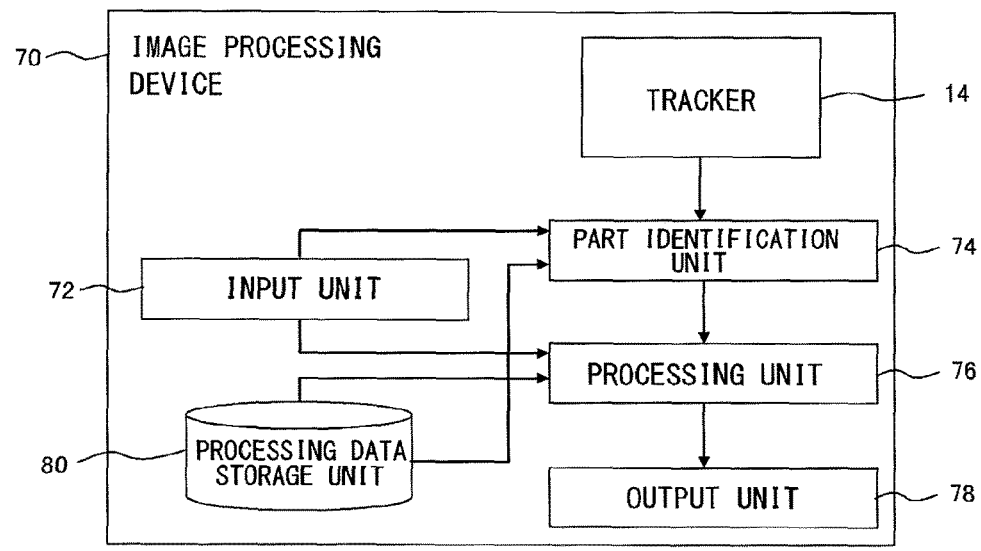
FIG. 8 illustrates the configuration of an image processing device that performs image processing by using a contour line acquired by the tracking process according to the embodiment.

FIG. 8 illustrates the configuration of an image processing device that performs image processing by using a contour line acquired by the tracking process. The image processing device 70 includes: a tracker 14 that acquires the contour line of an object; an input unit 72 that receives an instruction input from the user; a part identification unit 74 that identifies the position of a predetermined part of the object; a processing unit 76 that performs predetermined image processing based on the positional information of the predetermined part; an output unit 78 that outputs a result of performing the image processing; and a processing data storage unit 80 that stores data used for the image processing.

The tracker 14 can have the same configuration as the tracker 14 shown in FIG. 6. Depending on a part that is focused such as a head, there is a situation where the shape does not change; thus, for example, a process of the shape prediction unit 44 may be appropriately omitted in that case. Contrarily, when various change in the shape can be expected as in the case of a hand, it is ensured that a tracking process that addresses the shapes is ready to be performed. In this case, by defining the shape of the object in a linear combination of parameters defining a reference shape as described above, all kinds of shapes can be represented by only a small number of reference shapes that are made available. In the case of a hand, by preparing five shapes as reference shapes where any one of the five fingers is extended and the other fingers are closed, a hand can be represented where the number of fingers that are extended is one though five.

An image stored in the image storage unit 24 of the tracker 14 is used as an image to be processed. However, an embodiment may be employed where image data input to the image processing device 70 from a separately-provided image capturing device is tracked in real time and where image processing is then performed. The input unit 72 is an interface for a user to enter, into the image processing device 70, a selection of an instruction of starting or stopping a process and of the content of processing. The input unit 72 may be a general input device such as a keyboard, a mouse, a trackball, a button, or a touch panel, and may be combined with a display that displays selections, or the like at the time of inputting.

The part identification unit 74 acquires the data of a curve representing the contour line of an object, which is the tracking result from the tracker 14, and identifies the position of a target part such as a nail or a finger. The target part may be determined by the selection and the input into the input unit 72 by the user or may be set in advance. In either case, the information regarding the positional relationship between the contour line obtained from the tracker 14 and the target part is stored in the processing data storage unit 80. In the above-described example of nail art, the position of a fingernail is identified by setting, in advance, a rule for deriving the area of the fingernail based on a point of the contour of a hand that indicates the fingertip, the width of the fingertip, or the like. Further, the part identification unit 74 identifies the inclination of the object or the inclination of the target part based on the contour line.

Figure 9:
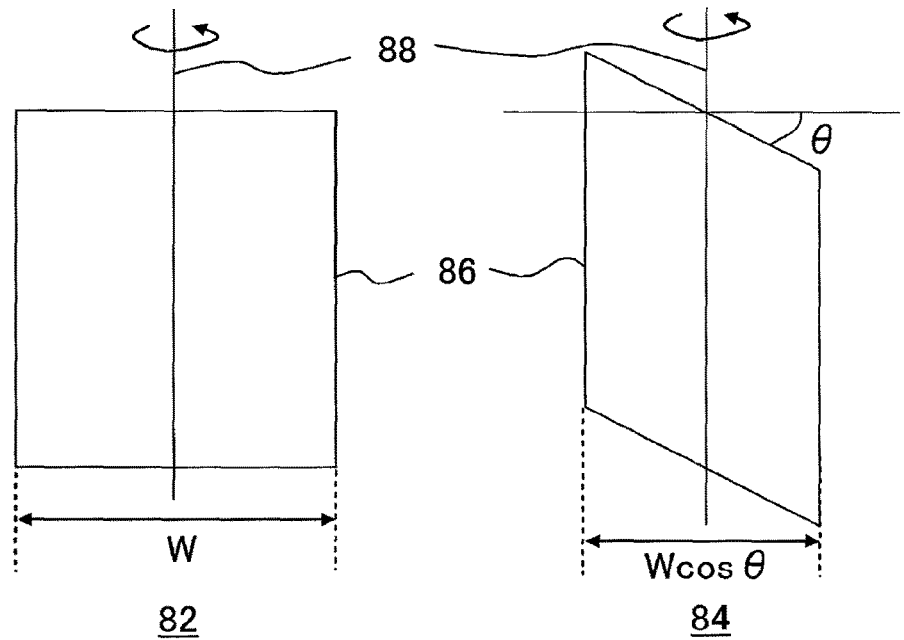
FIG. 9 illustrates an example of a method for identifying the inclination of the object by a part identification unit according to the embodiment.

FIG. 9 illustrates an example of a method for identifying the inclination of the object by the part identification unit 74. In the figure, a state 82 is obtained when an object 86 is viewed from the front, and a state 84 is obtained when the object 86 in the state 82 is rotated around a rotational axis 88 by an angle θ. If the width of the object, which is perpendicular to the rotational axis 88, is specified to be W, the apparent width also becomes W in the state 82, as shown in the figure. On the other hand, the width of the object in the state 84 appears to be Wcosθ. Therefore, for example, when the front image of the object is captured at first as an image for calibration, the rotation angle can be obtained based on the apparent width by using the relationship shown in FIG. 9. The same applies to the inclination of a target part. Information such as the position of the thumb or the like that can be obtained based on the contour line is appropriately used to find out the direction in which the target part is inclined. In the present embodiment, since the motion of the contour line is sequentially traced, a rotational axis can be easily obtained by acquiring the motion of the object for the frames of a predetermined number. The time change of the rotational angle may be obtained based on such motion of the object so as to estimate the inclination of the subsequent frame.

Referring back to FIG. 8, the processing unit 76 performs a predetermined processing on the target part identified by the part identification unit 74. The content of the processing may be determined by the selection and the input into the input unit 72 by the user or may be set in advance. Alternatively, it may be the combination of both. For example, selections of the nail art such as the color or the design are displayed on the display, and a selection input from the user is received. The image of the selected nail art is read from the processing data storage unit 80 and displayed over the fingernail part in the input image obtained by taking the image of the user's hand. Thus, image data necessary for the processing is stored in the processing data storage unit 80 such as three-dimensional graphics data, for example, the textual data or shape data of an image of a manicure, etc., to be combined.

Since the part identification unit 74 also identifies the inclination of the target part, the processing unit 76 changes an image to be combined in accordance with the inclination. The processing unit 76 not only changes the inclination of the image to be combined but also expresses change in the shade or the reflection of a light in accordance with the motion. When images to be combined are superimposed on top of each other due to the overlapping of the target parts, the part that is behind the other is identified based on the time change of the parts and the contour lines, and the hidden portion of the synthetic image that corresponds to the part behind the other is deleted. Generally-known methods such as shading and hidden surface removal in the field of three-dimensional graphics can be appropriately used for these processes. Further, since a contour line obtained in the present embodiment can address an arbitrary shape of an object, no particular image processing is performed when a target part cannot be viewed on the screen. For example, when a hand is in the shape of "scissors" showing the back of the hand at the front, the image of a manicure if placed over only the fingernails of the index finger and the middle finger.

The output unit 78 displays or stores, as moving image data, an image obtained as a result of the processing preformed by the processing unit 76. Therefore, the output unit 78 comprises a display or a memory device such as a hard disk drive. When the output unit 78 comprises a display, the display may be the same as the display of the input unit 72.

Figure 10:
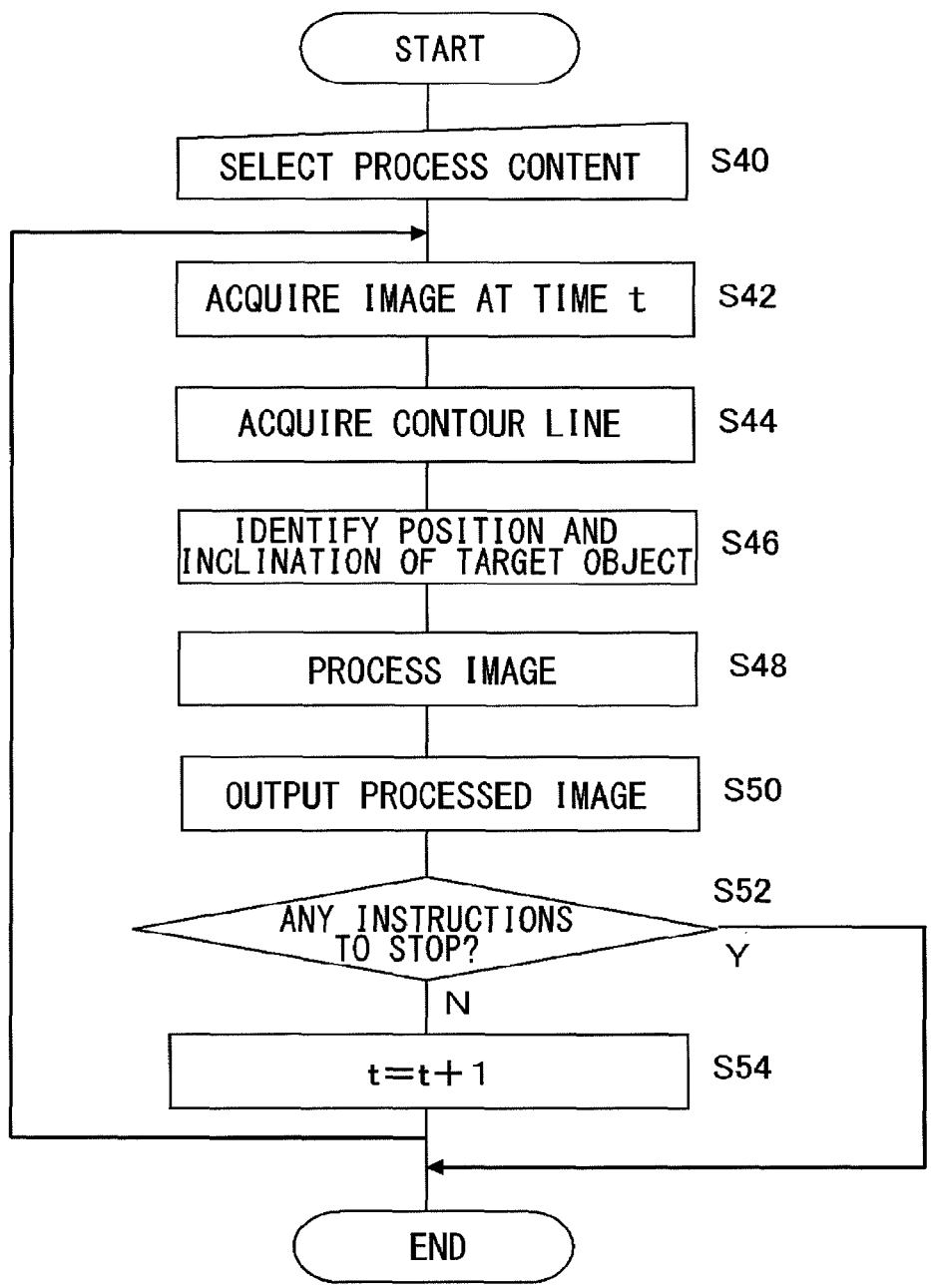
FIG. 10 is a flowchart showing the processing procedure of the image processing performed by the image processing device according to the embodiment.

An explanation is now given of the operation of the image processing device 70 having the above-stated configuration. FIG. 10 is a flowchart showing the processing procedure of the image processing performed by the image processing device 70. The user first enters, into the input unit 72, an input regarding a selection of an instruction to start processing or of the content of a process (S40). A multilevel input mode may be employed, for example, where a manicure of one's choice is selected from among the manicures displayed on the display after entering the instruction to start the process. A change made in the content of the process such as changing the selection to another manicure may be received as needed during the subsequent process.

The tracker 14 then acquires the image of the object at time t (S42) and acquires the contour line of the object by performing a tracking process (S44). As the image of the object, the image of the object such as a hand of the user placed on a certain place may be acquired in real time, or the image frame of a moving image captured in advance may be read from the image storage unit 24, as described above.

The part identification unit 74 then identifies the position and inclination of the part corresponding to the content of the processing based on the data of the contour line acquired from the tracker 14, as described above (S46). The part identification unit 74 then transmits information identified along with the image of the object to the processing unit 76. The processing unit 76 generates a processed image by performing the processing of the content selected by the user in S40 based on the information of the target part (S48). The output unit 78 performs an output process such as displaying the processed image that is generated (S50). When no instruction to stop the process is entered into the input unit 72 by the user (S52:N), the processes S42 through S50 are performed on each image frame while incrementing the time t (S54). The process is ended when an instruction to stop the process is entered by the user (S52:Y).

Such operations allow an image to be processed that follows the motion of an object while taking into consideration a change in shading or a reflected light, occlusion, etc. In the above explanation, an embodiment where a hand is specified to be an object and where nail art is tried on in a virtual space is used as a main example. However, the present embodiment allows many other applications to be realized. The explanation is given in the following of applications that can be realized by the image processing device 70.

Figure 11:
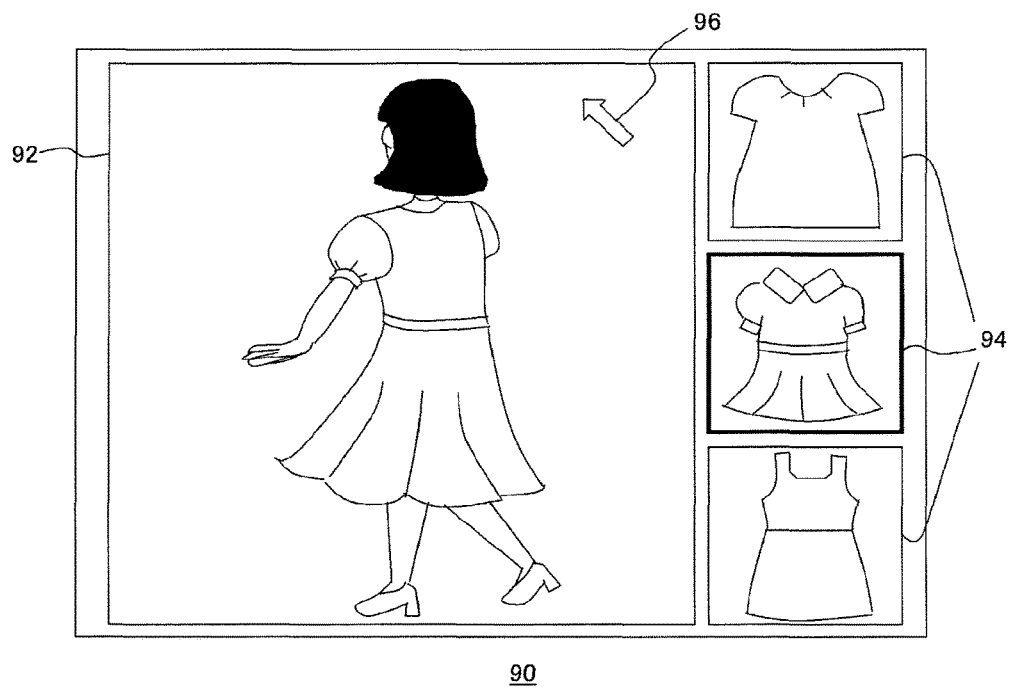
FIG. 11 illustrates an example of a screen displayed on a display when clothing fitting is realized in a virtual space by the image processing device according to the embodiment.

FIG. 11 illustrates an example of a screen displayed on a display of the output unit 78 when clothing fitting is realized in a virtual space by the image processing device 70. A virtual fitting screen 90 includes a fitting-image display area 92 and a clothing-image display area 94. In this embodiment, the user first stands in front of an image capturing device such that the entire body is within the viewing angle. An image acquired by the image capturing device that includes the entire body of the user is displayed in the fitting-image display area 92 of the virtual fitting screen 90. The user can view the image of his/her entire body that is captured from the front by arranging the image capturing device in the same orientation as that of the display.

A list of clothing that can be selected for fitting is displayed in the clothing-image display area 94. For example, clothing stores or auction sellers accepting orders via a network make their products available in images. The image processing device 70 acquires the images via a network in accordance with an instruction input from the user and displays the images in the clothing-image display area 94. On the assumption that the input unit 72 is a controller placed at User's hand that allows for the operation of a pointer 96 displayed in the virtual fitting screen 90, the user can operate the controller so as to select the clothing to try on in the clothing-image display area 94 by using the pointer 96.

Then, an image can be generated in which the clothing selected in the clothing-image display area 94 is blended over the user's body displayed in the fitting-image display area 92 by the processing procedure shown in FIG. 10. The image displayed in the fitting-image display area 92 allows the user to see himself/herself wearing the selected clothing. In the embodiment, the tracker 14 tracks the contour of the head of the user by using a Greek ohm-shaped template. Since a head can be tracked by translating, expanding, contracting, or rotating the Greek ohm-shaped template, as described above, the processes of the shape prediction unit 44 may be omitted.

The part identification unit 74 then identifies the position and size of the line of the shoulder in the Greek ohm-shaped head contour output by the tracker 14. The processing unit 76 then superimposes the image of the clothing on the image of the user such that the shoulder line of the image of the selected clothing overlaps the identified shoulder line of the user. Repeating the process for an image frame at each time allows the blended image of the clothing to be moved while following the motion of the user, thus making it seem that the user is moving while trying on the clothing.

The user may not face the image capturing device. Even when the user turns sideways or turns around, the part identification unit 74 detects the orientation of the body of the user on the same principle shown in FIG. 9 and rotates the image of the clothing accordingly. In order for this to work, images of the clothing captured from multiple predetermined angles are stored in advance in the processing data storage unit 80. For the other angles, images are interpolated by a well-known three-dimensional graphics method. Whether the body of the user has turned right or left may be speculated based on the motion in the previous image frame or may be determined based on the orientation of the face after introducing an existing face detection technique.

The example shown in FIG. 11 shows the user almost completely turning his/her back to the image capturing device. The user cannot view the virtual fitting screen 90 of the display at this moment, if the image capturing device and the display are arranged in the same orientation. The processing unit 76 may detect a state where the user is in a backward-looking posture and control the processed image generated at this time so that, for example, the display of the processed image is delayed by a predetermined amount of time over a few seconds. The state where the user is in a backward-looking posture is detected based on the time change of the width of the shoulder line of the contour line of the user or based on a fact that the face is not detected during a face detection process. This allows the user to check the back shot of the user wearing the clothing.

Further, when the processing unit 76 detects that the user is turning around based on, for example, the time change of the width of the shoulder line, the processing unit 76 may express the clothing, which is being worn, changing its shape according to the speed of rotation. For example, the shape of a skirt is changed so that it flares out at the bottom or the shape of a blouse is changed so that it blows up. Preparing a table, which stores the rotation speed and the shape variation in association with each other, according to the hardness of the clothing material or to the shape of the clothing in advance allows the shape variation according to the rotation speed to be expressed by using a general three-dimensional graphics technique. This allows the appearance of the clothing to be checked in a more realistic manner.

Mosaic processing is another example of the applications that can be realized by the image processing device 70. For example, mosaic processing can be performed only on the head of a person in a video image of the person, which is captured in advance. In this case, the tracker 14 also performs a tracking process of the head of the person by using a Greek ohm-shaped template so as to acquire the contour line. For example, the part identification unit 74 identifies, as the area of the head, an area surrounded by the Greek ohm-shaped contour line and by the segment of a line connecting the end points thereof. The processing unit 76 performs mosaic processing on the identified area. Repeating the process for an image frame at each time allows for the generation of a moving image on which mosaic processing is performed while following the motion of the person.

The tracker 14 constantly acquires the contour of the head regardless of the orientation of the face of the person. Therefore, the area of the head can be identified even when the identification by using face detection is difficult, for example, when the person turns sideways, looks down, or turns around. This can prevent the removal of mosaic due to a failure in face detection, even when the person can be identified by the back of the head, or prevent a situation where mosaic is constantly applied, in order to keep the mosaic, to an unnecessary part including an area around the person. This allows information regarding the figure of the person to be safely concealed while keeping necessary information the image has such as the surroundings of the person.

Figure 12:
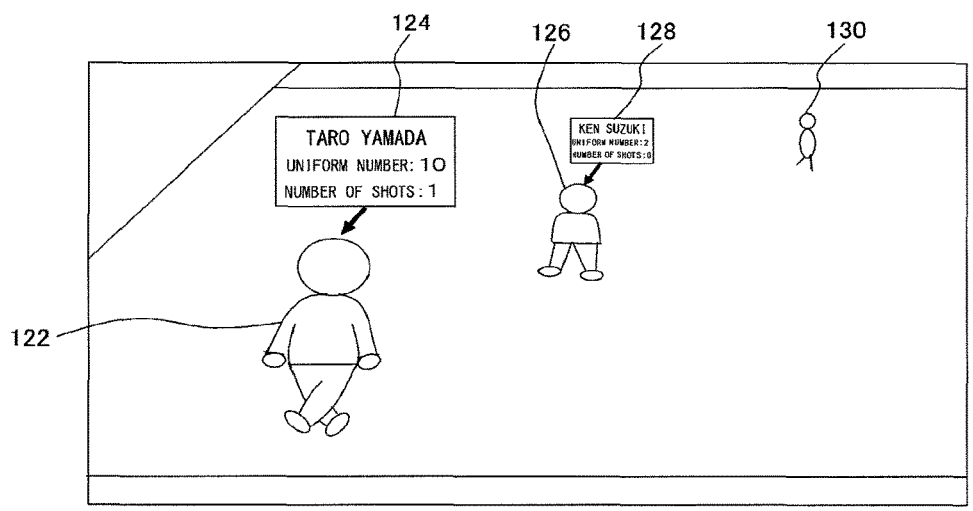
FIG. 12 illustrates an example of a screen that displays information on a player who is in the middle of playing a soccer game by the image processing device according to the embodiment.

Displaying information on an object on a screen is yet another example of the applications that can be realized by the image processing device 70. As an example, FIG. 12 illustrates a screen that displays information on a player who is in the middle of playing a soccer game. A player-information display screen 120 in the figure shows, for example, a live video of a game, and three people (a player 122, a player 126, and a player 130) are within the viewing angle of an image capturing device. A process is performed to add, above the heads of the players 122 and 126, images of information tags 124 and 128 comprising: arrows pointing to the players; and information regarding each player such as a name, a uniform number, the number of shots of the day, etc. As shown in the figure, the size of the information tags 124 and 128 is changed according to a distance between the player and the image capturing device.

In this case, the tracker 14 performs a tracking process of the head of the player in the video image of the game by using a Greek ohm-shaped template so as to acquire the contour line. The part identification unit 74 identifies, as the top of the head, the apex of the Greek ohm-shaped contour line and acquires the size of the contour line. The processing unit 76 determines the size of the information tag based on the correspondence relationship between the size of the contour line and the size of the information tag, which is set in advance. The processing unit 76 reads the information of each player, which is prepared in advance, from the processing data storage unit 80, generates the image of the information tag, and displays the image over the video image of the game such that the tip of the arrow points to the head of the player.

Preferably, the information tag is displayed such that the information tag does not overlap with other players. Therefore, the part identification unit 74 may identify an area where no other player exists based on the contour line of the head of the player within the viewing angle, and the processing unit 76 may display an information tag in the area. Repeating the process for an image frame at each time allows for the generation of a video image on which the information tag is displayed that follows the motion of the player.

Changing the size of the information tag in accordance with the distance from the image capturing device to the player allows a sense of distance to be added to the information tag. It also prevents information tags from being confusing even when there exists a lot of people within the viewing angle, thus allowing the player to which the information tag belongs to be easily found. When the tracker detects the overlapping of multiple players, the processing unit 76 may arrange the respective information tags so that they are overlapped with one another in a similar way and display the information tags such that a part of the information tag of the player in the back is concealed by the information tag of the player in the front.

Either the upper limit or lower limit for display or the both may be set for the size of the information tag. In the example of FIG. 12, an information tag is not displayed for the player 130 who is farthest away since the size of the information tag is below the lower limit. Setting the upper limit and the lower limit for the size of the information tag prevents the display of a small information tag in which the letters are illegible or of a large information tag that covers a large area in the image, thus allowing the image to be always eye-friendly.

Displaying an information tag in this manner allows a player to be easily identified in sports such as soccer and marathon where many people participate in a large area. It further allows the information of each player to be easily obtained while watching the status of a game, the motion of the player, etc. Whether to display or hide the information tag may be changed by an instruction input entered into the input unit 72 by the user. In addition to sports video, the information tag can be used for displaying, for example, information of a character or an actor in a drama and information of a product in a moving image. Information of a person or object in a virtual space drawn by computer graphics, in addition to a live-action image, may be displayed.

According to the above-described embodiment, the shape of a target object is represented in a linear combination of control point sequence that defines B-spline curves representing a plurality of reference shapes that are made available in advance. A coefficient set comprising coefficients for respective control point sequence is included in a parameter that defines a particle. In this way, the condensation algorithm that can address only the translation, expansion, contraction, or rotation of a single shape of a template can now be applied in an environment where the shape of the target object changes.

Since all the intermediate shapes of a reference shape can be represented by adjusting the coefficient set, a memory area to be used can be drastically reduced, and the number of parameters to be used for calculations can be also reduced, compared to when all the possible shapes of a target object are made available. Also, since a coefficient set can be dealt as the same way a shape-space vector is dealt, a conventional algorithm can be directly used. Thus, the advantages of a tracking process where a particle filter is used can be maintained without increasing the computational volume.

Further, by introducing a transition model of a coefficient set in a space, the subsequent shape can be predicted, and particles are distributed in the neighborhood of the coefficient set that defines the shape. This allows the tracking process to be efficiently and accurately achieved without increasing the number of the particles. In general, the shape recognition and the tracking process are considered to be different processes. However, those processes can be associated with each other by a concept of particles and can thus be simultaneously processed with used of a simple algorithm.

Also, setting a transition model of a shape and then distributing particles based on the transition model are almost the same as predicting the shape of an object. In this way, the shape of a hand of the user playing rock, paper, and scissors can be foreseen, and an interface that is highly responsive to the motion of the user can be also achieved. Therefore, application can be possible in a robot operated by remote control, an medical instrument, etc., in addition to a normal user interface of an information processing device.

Further, various functions can be provided by accurately acquiring the contour line of an object that performs at least any one of the shape change, translation, expansion or contraction, or rotation and then by performing image processing by using the information. More specifically, it allows, for example, nail art, a ring, or clothing to be tried on, mosaic processing to be performed, and an information tag to be added. Extraction of the contour of an object has conventionally required a task of manually checking image frames one by one so as to extract the contour, but a considerable operational cost should be incurred particularly in the case of moving images. The present embodiment allows contour lines to be accurately and easily obtained even in the case of moving images. Not like chromakey compositing that uses blue screens, green screen, etc., face detection technology or the like, no special condition is required for input images.

In this way, contour lines can be obtained while requiring small computational load compared to that required in conventional methods, and processing in accordance with the motion of an object can be readily performed. Since the inclination of an object and how the object is overlapped can be detected, the shape of an area to be processed or an image to be blended can be changed, and graphics processes such as shading, hidden surface removal, or the like can be further performed. Thus, a virtual space can be expressed in a more realistic manner. Since an area where an object exists and an area where the object does not exist can be identified according to the motion of the object, it is possible to perform processing only on the object or to select the area with no object so as to perform processing. Therefore, processed images that address the needs of the user in terms of the design and the information disclosure can be generated according to the circumstances.

Described above is an explanation of the present invention based on the embodiments. The embodiment is intended to be illustrative only, and it will be obvious to those skilled in the art that various modifications to constituting elements and processes could be developed and that such modifications are also within the scope of the present invention.

For example, in the present embodiment, the contour line of an object is represented in a linear combination of parameters that define a reference shape made available in advance so as to mainly estimate the contour line of a target object. Meanwhile, this method of representation is not limitedly used for the estimation of the contour line of a target object and can be widely applied as a representation method for drawing an object. For example, the representation method can be used in the generation of polygon data used in three-dimensional computer graphics. Even in such a case, the amount of memory used can be notably reduced compared to when parameter sets of all the shapes that can be represented are made available in advance.

EXPLANATION OF REFERENCE NUMERALS 10 visual tracking system
12 image capturing device
14 tracker
16 display
20 image acquisition unit
22 image processing unit
24 image storage unit
26 target-object area detection unit
28 tracking start-and-stop determining unit
30 tracking processing unit
30 observation unit
36 result storage unit
40 output control unit
42 sampling unit
44 shape prediction unit
46 shape-space vector prediction unit
48 observation unit
50 result acquisition unit
70 image processing device
72 input unit
74 part identification unit
76 processing unit
78 output unit
80 processing data storage unit
90 virtual fitting screen
92 fitting-image display area
94 clothing-image display area
120 player-information display screen

INDUSTRIAL APPLICABILITY

As described above, the present invention is applicable to an information processing device such as a computer, a game device, and an image display.

The invention claimed is:
1. An image processing device comprising:
  a contour line acquisition unit configured to acquire a contour line of an object from an image frame that constitutes a moving image;
  a target part identification unit configured to identify the position of a predetermined part of the object based on the contour line of the object acquired by the contour line acquisition unit;
  a processing unit configured to create a processed image in which predetermined processing is performed on an area, which is determined based on the position of the predetermined part identified by the target part identification unit, in the image frame;
  an output unit configured to output data of the moving image having, as the image frame, the processed image generated by the processing unit; and
  a storage unit configured to store data of a three-dimensional graphics image of a fingernail with nail art, wherein
  the contour line acquisition unit acquires the contour line of a human hand, which is the object,
  the target part identification unit identifies an area of the fingernail based on the position of a fingertip in the contour line, and
  the processing unit combines the image of the fingernail with nail art such that the image of the fingernail with nail art selected by a user is overlapped with the area of the fingernail, and
  the contour line acquisition unit acquires, by adjusting through, matching score computation, a set of coefficients occurring when a parameter of a B-spline curve that defines the contour line of the hand is represented in a linear combination of a parameter that defines the contour line of a plurality of reference shapes defined in advance.

2. The image processing device according to claim 1, wherein
  the target part identification unit acquires the time change of the inclination of the predetermined part from the time change of the contour line, and the processing unit creates the processed image so that a result of the processing is time-variable in accordance with the time change of the inclination of the predetermined part.

3. The image processing device according to claim 1, wherein the contour line acquisition unit represents the parameter of the B-spline curve in a linear combination of a parameter of respective B-spline curves of five reference shapes, in each of which any one of the five fingers is extended.

4. The image processing device according to claim 1, wherein the processing unit combines, in an area entirely outside the contour of the object determined based on the position of the predetermined part identified by the target part identification unit, an image displaying information regarding the object.

5. The image processing device according to claim 1, wherein the processing unit does not combine an information tag having a size below a lower limit or above an upper limit, which are set for the size of the information tag in advance.

6. The image processing device according to claim 1, wherein
the target part identification unit detects, based on the time change of the contour line of the object, that at least a part of a first part is hidden behind a second part, and
the processing unit performs, when combining images corresponding to the first part and the second part, respectively, as the process, a hidden-surface removal process so that at least a part of the image corresponding to the first part is hidden by the second part.

7. An image processing method comprising:
reading an image frame constituting a moving image stored in a memory and acquiring a contour line of a human hand;
reading, from the memory, data of a three-dimensional graphics image of a fingernail with nail art;
adjusting, through matching score computation, a set of coefficients occurring when a parameter of a B-spline curve that defines the contour line of the human hand is represented in a linear combination of a parameter that defines the contour line of a plurality of reference shapes defined in advance,
wherein the plurality of reference shapes are possible known different configurations of the human hand;
identifying an area of a fingernail of the human hand in the image frame based on the contour line; and
creating a processed image in which the three-dimensional graphics image is overlapped with the area of the fingernail.

8. A non-transitory computer-readable recording medium having embodied thereon a computer program product comprising modules of:
reading an image frame constituting a moving image stored in a memory and acquiring a contour line of a human hand;
reading, from the memory, data of a three-dimensional graphics image of a fingernail with nail art;
adjusting, through matching score computation, a set of coefficients occurring when a parameter of a B-spline curve that defines the contour line of the human hand is represented in a linear combination of a parameter that defines the contour line of a plurality of reference shapes defined in advance,
wherein the plurality of reference shapes are possible known different configurations of the human hand;
identifying an area of a fingernail of the human hand in the image frame based on the contour line; and
creating a processed image in which the three-dimensional graphics image is overlapped with the area of the fingernail.

* * * * *